United States Patent [19]
Walworth et al.

[11] Patent Number: 6,050,915
[45] Date of Patent: Apr. 18, 2000

[54] BELT TENSIONER

[76] Inventors: Roger L. Walworth, 813 Shewville Rd., Ledyard, Conn. 06339; Richard Boulanger, 13 Elijah St., Norwich, Conn. 06360

[21] Appl. No.: 09/150,143

[22] Filed: Sep. 9, 1998

[51] Int. Cl.⁷ .................. F16H 7/08; F16H 7/14; F16M 1/00
[52] U.S. Cl. .................. 474/114; 474/101; 248/664
[58] Field of Search ................ 474/101, 113, 474/114, 126, 133, 136; 248/421, 664, 669, 284.1, 285.1

[56] References Cited

U.S. PATENT DOCUMENTS

| | | | |
|---|---|---|---|
| 4,512,752 | 4/1985 | Brenneman | 474/114 |
| 5,214,448 | 5/1993 | Venthem | 474/114 |
| 5,305,673 | 4/1994 | Costley | 474/114 |
| 5,580,027 | 12/1996 | Brodersen | 248/421 |
| 5,902,202 | 5/1999 | Guerra | 474/114 |
| 5,921,876 | 7/1999 | Zelinski | 474/114 |

*Primary Examiner*—Tamara L. Graysay
*Assistant Examiner*—Matthew A. Kaness
*Attorney, Agent, or Firm*—Raymond D. Thompson

[57] ABSTRACT

A motor mounting apparatus supports a motor relative to a base for relative rotation about a pivot axis to control tension in an endless loop driving element. A driving element emcompasses a drive member driven by the motor about a drive member axis and a driven member coupled to a load and driven by the driving member about a driven member axis to transmit power from the motor to the load. The apparatus includes a threaded shaft rotatable by a user about a shaft axis. The shaft axis is fixed relative to a first of the base and motor. A rider is carried by the threaded shaft so that rotation of the threaded shaft about the shaft axis produces longitudinal translation of the rider along the shaft axis relative to such first one of the base and motor. A rigid link has a first end pivotally coupled to the rider and a second end pivotally coupled to a second one of the base and motor.

10 Claims, 6 Drawing Sheets

6,050,915

BELT TENSIONER

BACKGROUND OF THE INVENTION

The invention relates to the tensioning of belts, drive chains and the like. More particularly, the invention relates to a tensioner for controlling tension in a drive belt of an extrusion apparatus.

FIG. 1 shows a prior art extruder 20. The extruder has a hopper 22 for storing and dispensing a feedstock such as a pelletized plastic 24. The base of the hopper is placed in communication with an inlet of a screw assembly 26 which contains a screw (not shown), compacts the feedstock 24 and drives it through a die 28 proximate an outlet 30 of the extruder. The screw rotates about a central extrusion axis 200. Power to drive the drive screw is provided by an electric motor 32 supported on a base 34. The drive screw is connected to a transmission 36 which has an input pulley or sheave 38 mounted on an input shaft 40 rotatable about a horizontal input pulley axis 202 parallel to the extrusion axis. The motor 32 has a drive shaft 42 and a drive pulley or sheave 44 mounted thereon. The pulley 44 and shaft 42 are rotatable by the motor about a horizontal drive pulley axis 204 parallel to the axes 200 and 202. A v-belt 46 overwraps the pulleys 38 and 44 to transmit torque and rotation from the motor to the transmission so as to drive the drive screw.

The motor is attached to a motor mounting plate 50. Four threaded studs 52 (of which two are shown) extend upward from the base 34 to carry the motor. Specifically, each stud bears lower and upper nuts 54 and 56 respectively. The underside of the plate 50 is supported on the upper surfaces of the lower nuts 54 and the upper surface of the plate 50 is engaged to the undersides of the upper nuts 56 to prevent upward movement of the plate 50 and motor 32.

To increase tension in the belt 46, a user sequentially applies a wrench (not shown) to each lower nut 54 rotating the nut to lower it along the associated stud 52. The motor and plate will typically descend along with the nuts 54 whereupon the user may apply the wrench sequentially to the upper nuts 56 to lower the nuts 56 to tighten them against the plate 50. If necessary, where a relatively high tension in the belt is required, the plate 50 will remain engaged to the upper nuts 56 when the lower nuts 54 are lowered. The tightening of the nuts 56 drives the plate and motor downward into engagement with the nuts 54 and, thereby, increases tension in the belt 46.

Decreasing tension in the belt 46 is accomplished in the reverse of the foregoing process. Tensioning and detensioning of the belt are not merely performed during operation of the extruder but, rather, are also performed to facilitate belt replacement or change out of the pulleys 38 and 44 to alter the drive ratio between the motor 32 and the transmission 36. In addition to the expenditure of user effort, the time required for the sequential turning of the various nuts 54 and 56 imposes significant downtime for the extruder.

Accordingly, there is a need for belt tensioning system which provides enhanced ease and speed of use, reducing user effort and extruder downtime.

BRIEF SUMMARY OF THE INVENTION

Accordingly, in one aspect the invention is directed to a motor mounting apparatus. The apparatus supports a motor relative to a base for relative rotation about a pivot axis to control tension in an endless loop driving element. A driving element emcompasses a drive member driven by the motor about a drive member axis and a driven member coupled to a load and driven by the driving member about a driven member axis to transmit power from the motor to the load. The apparatus includes a threaded shaft rotatable by a user about a shaft axis. The shaft axis is fixed relative to a first of the base and motor. A rider is carried by the threaded shaft so that rotation of the threaded shaft about the shaft axis produces longitudinal translation of the rider along the shaft axis relative to such first one of the base and motor. A rigid link has a first end pivotally coupled to the rider and a second end pivotally coupled to a second one of the base and motor. In one embodiment a first plane containing the pivot axis and the drive member axis is within 10° of orthogonal to a second plane containing the drive member axis and the driven member axis.

The rider may include a pair of trunnions along a trunnion axis pivotally coupling the rider to the first end of the link. The apparatus may include a hinge pivotally coupling the motor to base for relative rotation about the pivot axis. The threaded shaft may include the unitarily formed combination of a threaded body portion extending from a first body end to a second body end. A first pivot extending from the first body end, a second pivot extending from the second body end and an engagement feature extending from the first pivot. The endless loop driving element may be a v-belt driven on a sheave connected to the motor and the threaded shaft may provide a range of adjustment including a position wherein the v-belt may be removed form the sheave. The first one of the base and motor may be the base and the first end of the rigid link may be pivotally coupled to the rider for relative rotation about a first link axis parallel to the pivot axis. A second end of the rigid link may be pivotally coupled to the motor for relative rotation about a second link axis. The coordinate of the drive member axis along a first coordinate axis extending from an origin at the pivot through the second link axis may be between 10 and 90 percent of the position of the second link axis along that first coordinate axis. The coordinate of the drive member axis along a second coordinate axis orthogonal to the first coordinate axis and having an origin at the pivot axis may have a magnitude less than 30 percent of the distance between the pivot axis and the second link axis.

These and other aspects of the present invention will be readily apparent upon reading the following detailed description of the invention, as well as the drawing and the claims.

BRIEF DESCRIPTION OF THE SEVERAL VIEWS OF THE DRAWING

Like reference numbers and designations in the several views indicate like elements.

DETAILED DESCRIPTION OF THE INVENTION

Figure 1:
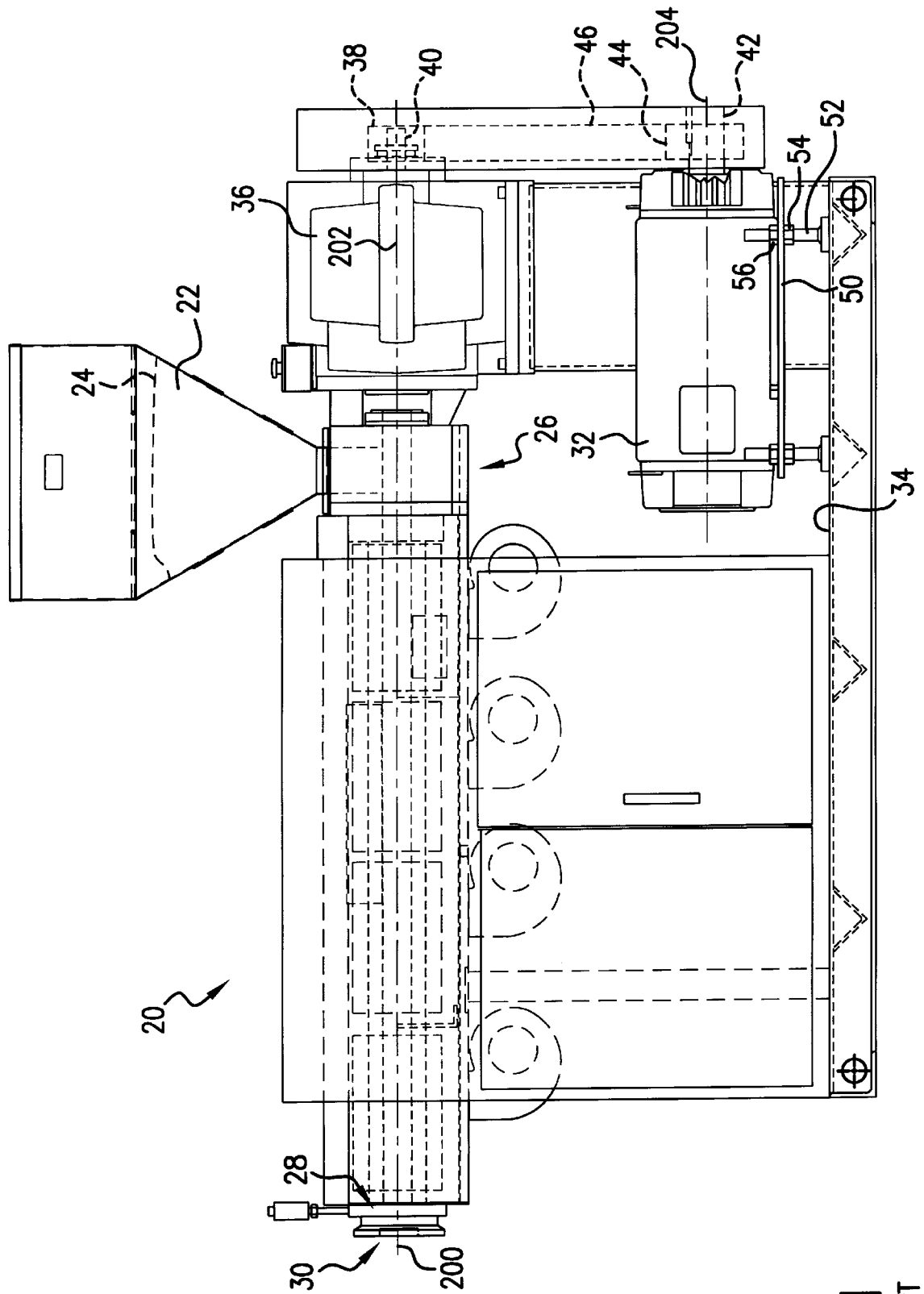
FIG. 1 is a side view of a prior art extruder.
Figure 2:
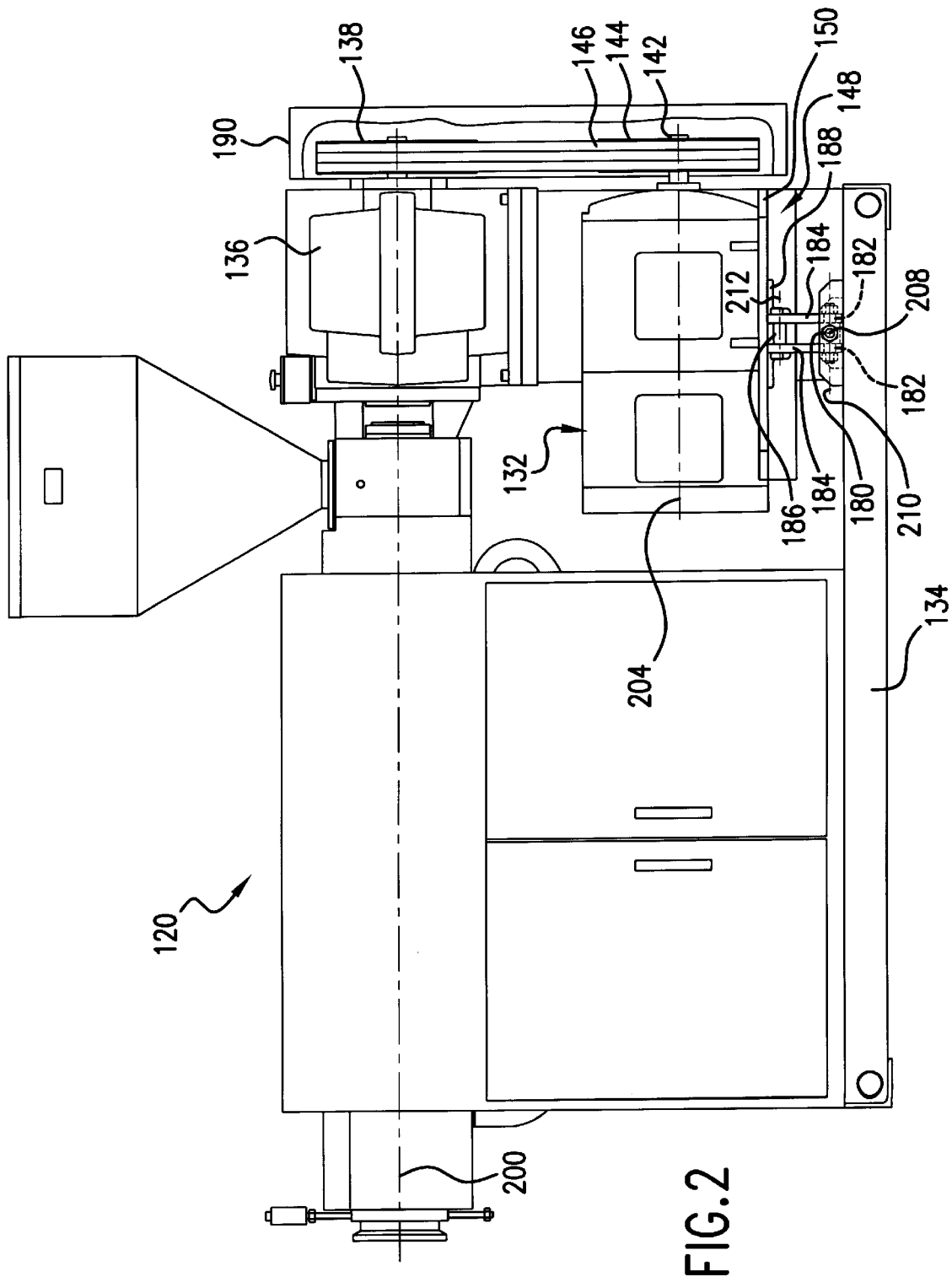
FIG. 2 is a side view of an extruder having a motor mount and belt tensioning apparatus according to principles of the invention.

FIG. 2 shows an extruder 120 which may have an overall structure generally similar to that of extruder 20 of FIG. 1.

Figure 3:
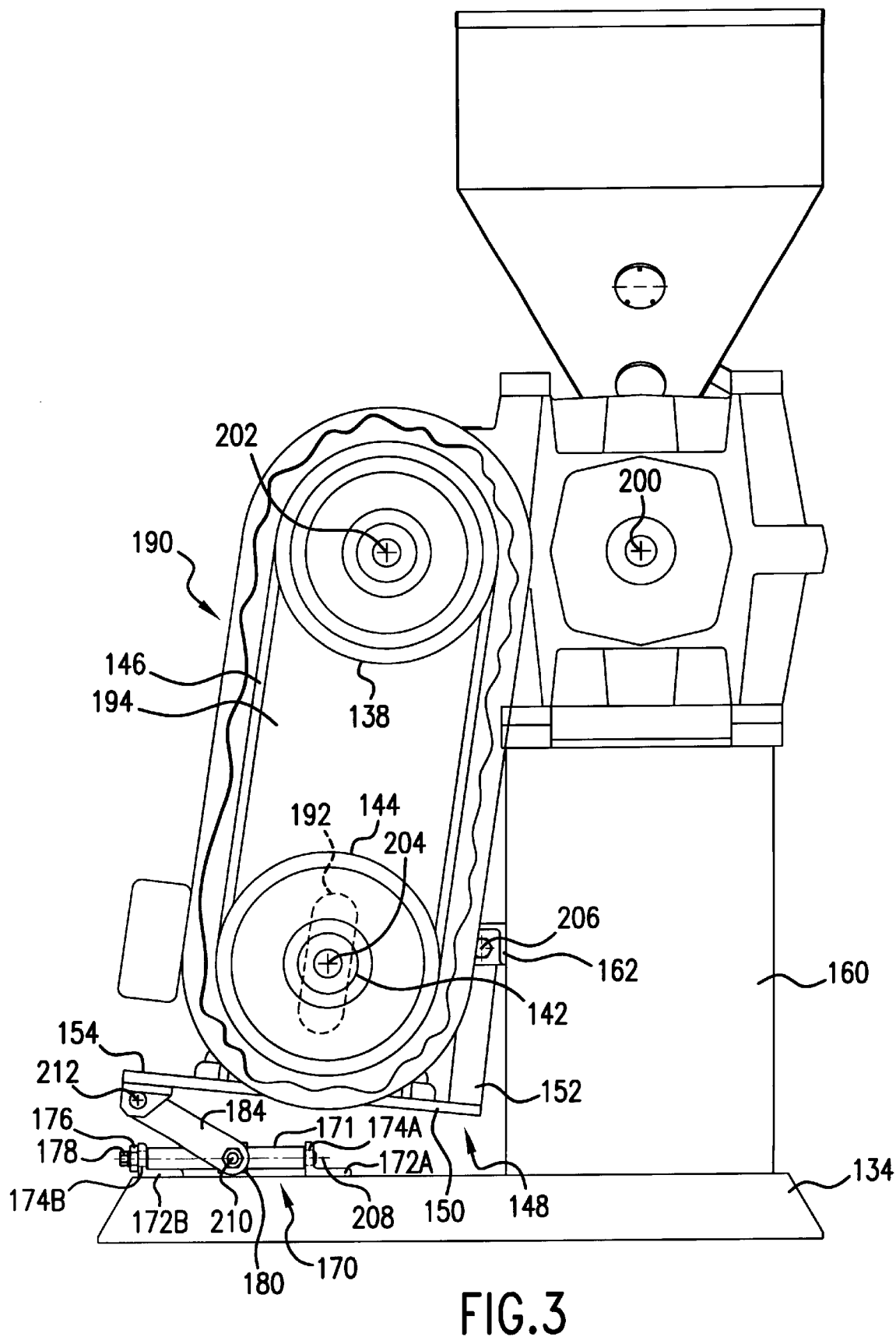
FIG. 3 is a back view of the extruder of FIG. 2.

A motor mounting fixture 148 includes a plate 150 to which the motor 132 is mounted and a pair of uprights or brackets 152 (as illustrated in FIG. 3) extending upward from the upper surface 154 of the plate 150. In the exemplary embodiment, the motor 132 has a maximum output power of 300 hp or less.

Figure 4:
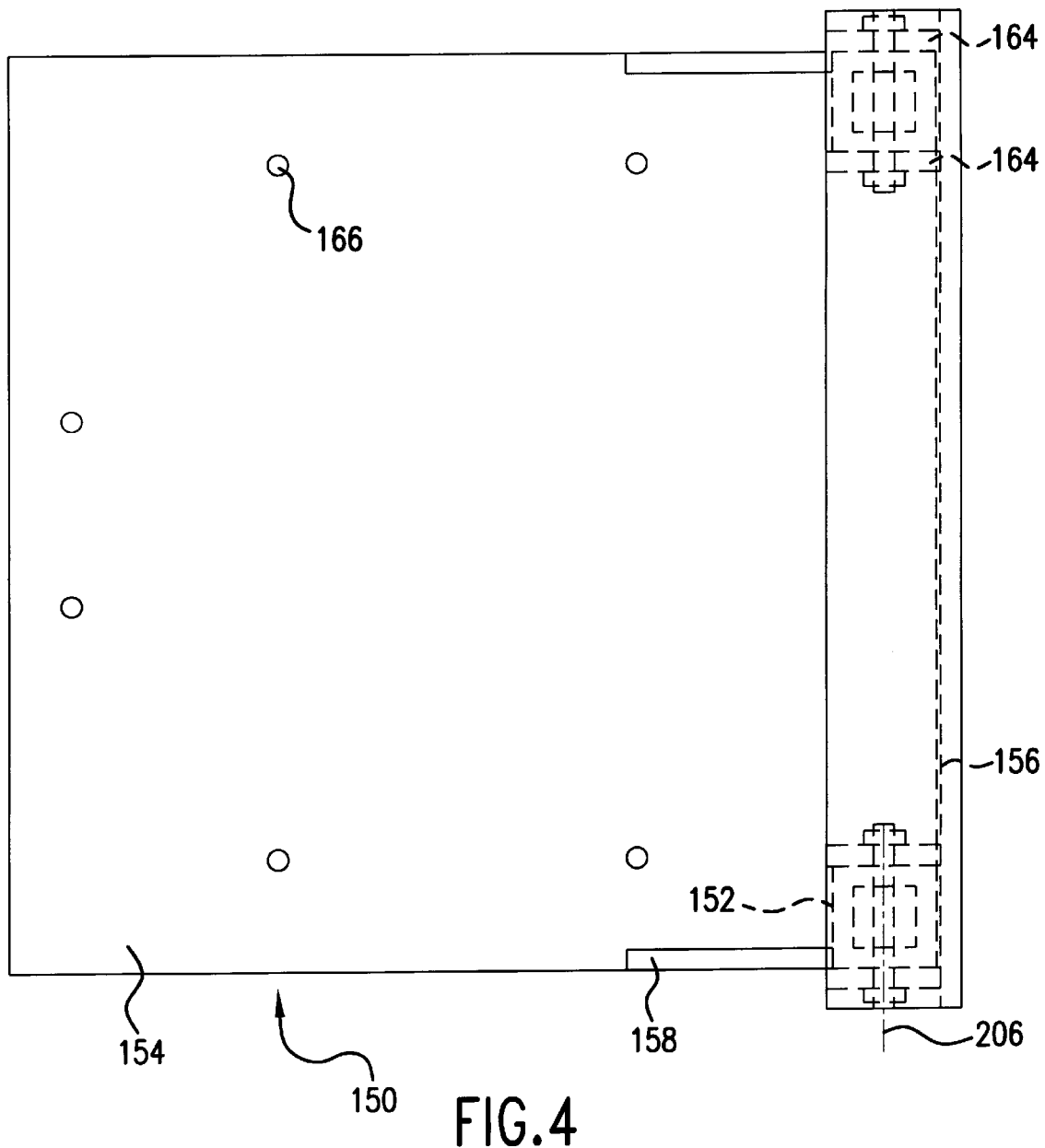
FIG. 4 is a partial top view of a motor mounting fixture of the extruder of FIG. 2.

As shown in FIG. 4, in the exemplary embodiment each upright is formed as a square-sectioned tube located proximate an inboard edge 156 of the plate 150. In the exemplary embodiment, one upright is located proximate a corner of the plate 150 adjacent the fore edge of the plate and the other in a corner adjacent the aft edge of the plate. Associated with each upright 152 is an approximately triangular reinforcement bracket 158 which in the exemplary embodiment is welded to the associated upright and to the plate 150 and maintains the relative orientation between the upright and plate.

As shown FIG. 3, the mounting fixture 148 is pivotally coupled to the body section 160 of the extruder 120 and thus, to the base 134 from which the body extends upward. Specifically, the mounting fixture is coupled to the body for relative rotation about a horizontal pivot axis 206 substantially parallel to the motor/drive pulley axis 204, driven pulley axis 202, and extruder axis 200. A downward facing L-sectioned bracket 162 extends along the body 160 and is secured thereto. On either side of each upright 152 the bracket 162 includes a pair of webs 164 (FIG. 4) co-aligned along the pivot axis 206. A pair of pivot bolts extend through corresponding apertures in the webs 164 and brackets 152 to substantially secure the mounting fixture to the body against all relative motion except rotation about the pivot axis. As further shown in FIG. 4, the plate 150 includes four mounting holes 166 for securing the mounting blocks of the motor to the plate 150 via bolts (not shown). The upper surface 154 provides flat co-planar mounting surfaces surrounding each hole 166 so as to define a motor mounting plane.

An actuation mechanism includes a threaded shaft 170 (FIG. 3) held horizontally above the base 134 by a pair of L-sectioned mounting brackets 172A and 172B. The leg portion of each bracket 172A, 172B lies flat against the upper surface of the base 134 and is secured thereto via bolts (not shown) extending through matching holes in the brackets 172A, 172B and base 134. The foot section of each bracket 172A, 172B extends upward from the base 134 and includes a central aperture which rotatably receives an unthreaded pivot portion 174A and 174B extending from opposite ends of the threaded body portion 171 of the shaft 170. Immediately beyond the outboard unthreaded pivot portion 174B, the shaft 170 has a second threaded portion of reduced diameter relative to the threaded body portion 171. This second threaded portion bears a nut 176 which, along with a shoulder between the body portion 171 and the pivot portion 174B cooperates to sandwich the foot of the outboard bracket 172B and, thereby, secure the shaft against translation along its shaft axis 208. Beyond the nut 176, proximate the outboard end of the shaft 170 the shaft includes a multifaceted engagement feature which may cooperate with a mating driver such as a wrench (not shown) held by a user to allow the user to rotate the shaft 170 about its axis 208.

Figure 5:
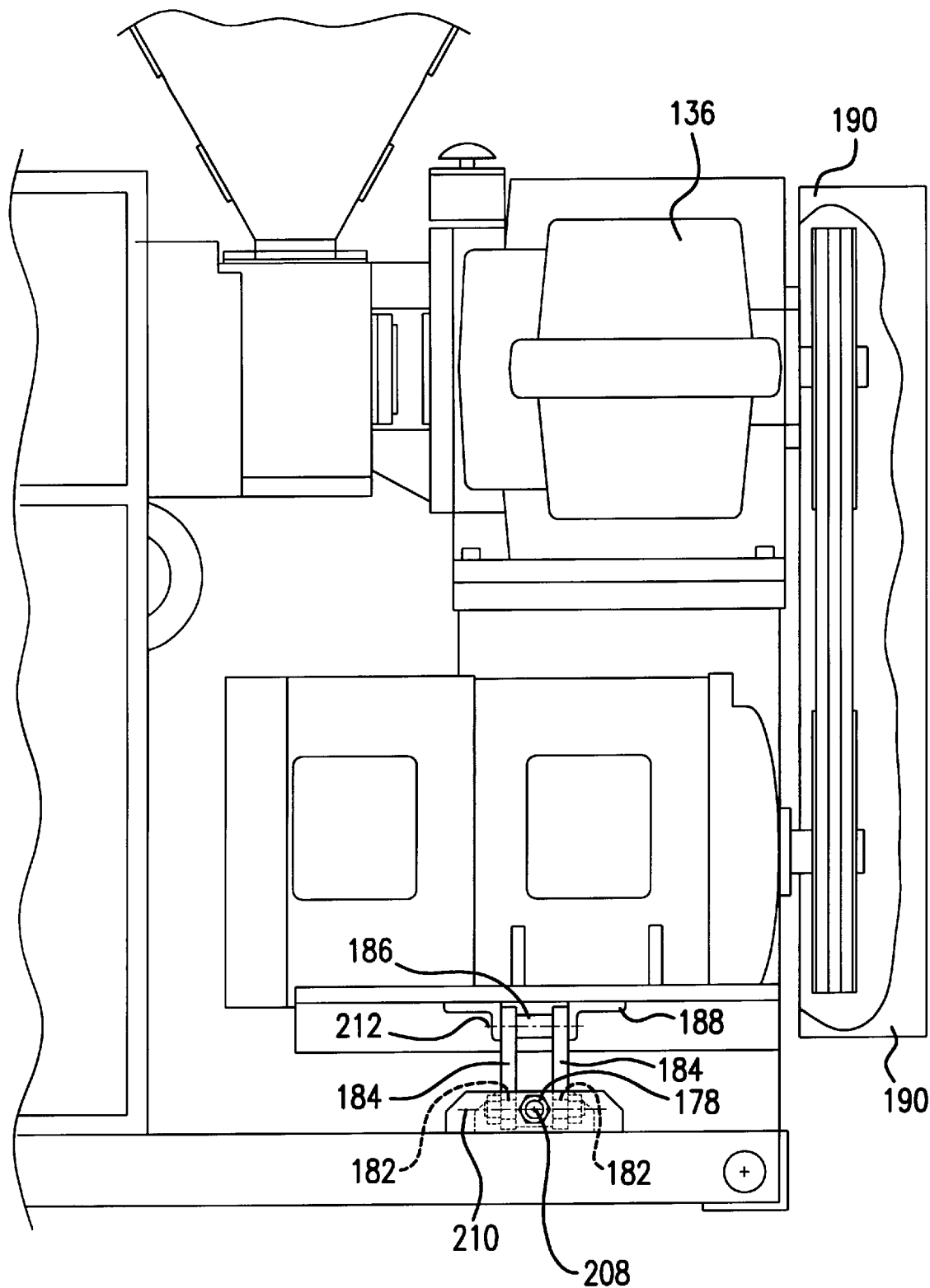
FIG. 5 is a partial side view of the extruder of FIG. 2.

An internally threaded rider 180 is carried by the shaft 170 in threaded engagement to the body portion 171. Rotation of the rider 180 relative to the body portion 171 about the axis 208 thus causes the rider to translate along that axis. The rider includes a pair of trunnions 182 (FIG. 5) extending along a trunnion axis 210 which, in the exemplary embodiment, is perpendicular to and intersecting the shaft axis 208 and is thus parallel to the motor and pivot axes 204 and 206. The trunnions 182 are received by a rigid link in the form of a pair of arms 184, each arm receiving an associated trunnion. A pair of nuts on threaded ends of the respective trunnions secures the associated arm 184 to the trunnion and rider against all relative movement except rotation about the trunnion axis 210. Proximate their upper ends, the arms 184 are received by an axle 186 having an axle axis 212. The axle is secured to the plate 150 via a pair of L-sectioned brackets 188 with their leg portions secured along the underside of the plate and their foot portions respectively receiving opposite ends of the axle 186.

In operation, with the user facing the engagement feature 178 a clockwise rotation of the feature 178 and shaft 170 draws the rider 180 toward the user along the axis 208 (assuming the threading of the shaft and rider is right-handed, the opposite occurring if left-handed). The lower ends of the arms 184 move along with the rider, causing the arms to rotate about the trunnions 182 to assume a more vertical orientation. The upper ends of the arms 184 rotate about the axle axis 210 raising the outboard edge of the plate 150 and, thereby, rotating the motor mounting fixture and motor about the pivot axis 206. This raises the motor and drive pulley 144, and, with the driven pulley 138 being located above the motor, draws the motor closer to the driven pulley and decreases tension in the belt 146. In the exemplary embodiment, a belt guard 190 enshrouds the drive pulley, driven pulley and drive belt. The belt guard is rigidly secured to the transmission 136. As the motor is raised, its shaft 142 moves along an elongate aperture 192 (FIG. 3) in an inboard wall 194 of the shroud 190.

Figure 6:
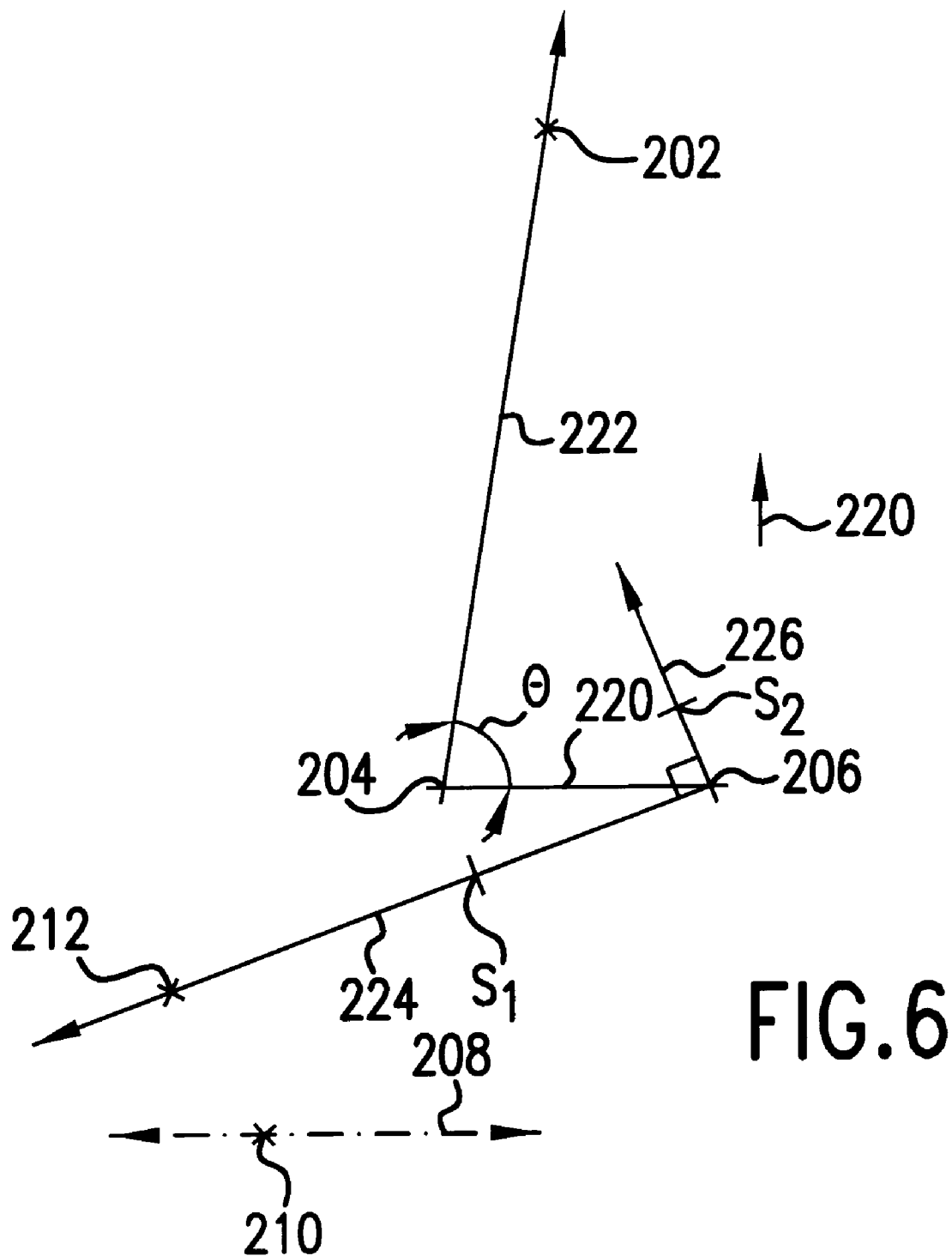
FIG. 6 is a schematic view showing the relative locations of various axes in the belt tensioning apparatus of the invention.

FIG. 6 more clearly shows the relative locations of the various axes. An angle θ is defined between a plane 220 containing the pivot axis 206 and motor/drive pulley axis 204 and a plane 222 containing the axis 204 and the driven pulley axis 202. Advantageously, the two planes are close to or orthogonal each other (e.g. θ is approximately 90°). Preferably, the two planes are within approximately 15° of orthogonal to each other, more preferably, within 10°. The near orthogonality minimizes the total movement of the motor and drive pulley associated with a given change of distance between the axes 202 and 204 and thus the associated change of tension in the belt 146.

FIG. 6 further shows a first coordinate axis 224 extending from an origin at the axis 206 through the axle axis 212. A second coordinate axis 226 is defined orthogonal to the first coordinate axis 224 and having a origin at the pivot axis 206 and extending orthogonal thereto. The motor/drive pulley axis 204 has coordinates $S_1$ and $S_2$ along the axes 224 and 226 respectively. Advantageously, the coordinate $S_1$ lies between the origin and the axis 212. Preferably, the coordinate $S_1$ is between about 10 percent and 90 percent of the coordinate of the axis 212 along the first coordinate axis 224. In the illustrated embodiment, the value is about 40 percent. Furthermore, advantageously the coordinate $S_2$ of has a magnitude of less than about 30 percent of the distance between the pivot axis 206 and axle axis 212.

Although one or more embodiments of the present invention have been described, it will nevertheless be understood that various modifications may be made without departing from the spirit and scope of the invention. For example, a variety of mounting fixture and accurator geometries may be utilized. Additional, a variety of drivers may be utilized, including adaptation for automated driving of the accurator to allow automated control of belt tension. Accordingly, other embodiments are within the scope of the following claims.

What is claimed is:

1. A motor mounting apparatus supporting a motor relative to a base for relative rotation about a pivot axis and controlling tension in an endless loop driving element wherein the endless loop driving element encompasses a drive member driven by the motor about a drive member axis and a driven member coupled to a load and driven by the driving element about a driven member axis to transmit power from the motor to the load, the apparatus comprising:

a threaded shaft, rotatable by a user about a shaft axis, said shaft fixed relative to a first one of the base and motor;

a rider, carried by the threaded shaft so that rotation of the threaded shaft about the shaft axis produces longitudinal translation of the rider along the shaft axis relative to said first one of the base and motor; and a rigid link having a first end pivotally coupled to the rider and a second end pivotally coupled to a second one of the base and motor;

wherein a first plane containing the pivot axis and the drive member axis is within 15 degrees of orthogonal to a second plane containing the drive member axis and the driven member axis.

2. The apparatus of claim 1 wherein the rider includes a pair of trunnions along a trunnion axis pivotally coupling the rider to the first end.

3. The apparatus of claim 1 further comprising a hinge pivotally coupling the motor to the base for relative rotation about the pivot axis.

4. The apparatus of claim 1 wherein the threaded shaft includes the unitarily formed combination of:

a threaded body portion extending from a first body end to a second body end;

a first pivot extending from the first body end;

a second pivot extending from the second body end; and an engagement feature extending from the first pivot.

5. The apparatus of claim 1 wherein the endless loop driving element is a v-belt driven on a sheave connected to the motor and the threaded shaft provides a range of adjustment including a position wherein the v-belt may be removed from the sheave.

6. The apparatus of claim 1 wherein said first of the base and the motor is the base and wherein the first end of the rigid link is pivotally coupled to the rider for relative rotation about a first link axis parallel to the pivot axis and a second end of the rigid link is pivotally coupled to the motor for relative rotation about a second link axis.

7. The apparatus of claim 6 wherein the coordinate of the drive member axis along a first coordinate axis extending from an origin at the pivot axis through the second link axis is between 10% and 90% of the position of the second link axis along the first coordinate axis.

8. The apparatus of claim 7 wherein the coordinate of the drive member axis along a second coordinate axis orthogonal to the first coordinate axis and having an origin at the pivot axis has a magnitude less than 30% of the distance between the pivot axis and the second link axis.

9. The apparatus of claim 1 wherein the user-induced rotation of the threaded shaft about the shaft axis in a first direction increases said tension and such rotation opposite the first direction decreases said tension.

10. The apparatus of claim 1 wherein the motor has a maximum output power of 224 kW (300 hp) or less.

* * * * *